United States Patent [19]

MacMillan

[11] 4,030,863

[45] June 21, 1977

[54] VENTING RETAINER FOR CURING TUBE

[76] Inventor: Kenneth T. MacMillan, 4992 Wesleyan Woods Drive, Macon, Ga. 31201

[22] Filed: July 19, 1976

[21] Appl. No.: 706,374

[52] U.S. Cl. ............................... 425/17; 425/43; 425/51; 425/52; 425/812

[51] Int. Cl.² ............... B29H 5/02; B29H 5/04

[58] Field of Search .............. 425/21, 22, 23, 31, 425/32, 33, 34, 35, 36, 37, 38, 39, 40, 41, 42, 43, 44, 45, 46, 47, 48, 49, 50, 51, 52, 53, 54, 55, 56, 57, 58, 812

[56] References Cited

UNITED STATES PATENTS

| | | | |
|---|---|---|---|
| 1,392,576 | 10/1921 | Goodenberger | 425/812 |
| 3,008,235 | 11/1961 | Royer et al. | 425/812 |
| 3,160,928 | 12/1964 | Smillie | 425/812 |
| 3,170,195 | 2/1965 | Knox | 425/51 |
| 3,230,590 | 1/1966 | Schaible et al. | 425/812 |
| 3,676,028 | 7/1972 | Christie et al. | 425/38 |
| R23,829 | 5/1954 | Goss | 425/812 |

*Primary Examiner*—J. Howard Flint, Jr.
*Attorney, Agent, or Firm*—Diller, Brown, Ramik & Wight

[57] ABSTRACT

This disclosure relates to a venting retainer for a tire curing tube, bladder or the like including means for generally porously encapsulating a tire curing bladder exteriorly thereof whereby upon the upon the insertion of the encapsulating means and the tire curing bladder into a tire internal air is automatically vented to atmosphere. The encapsulating means is preferably composed of a plurality of criss-crossed strands, said strands are secured between a pair of plates, and said plates are relatively movable toward and away from each other to vary the configuration of the encapsulating means prior to and during the insertion of the encapsulating means into a tire adapted to be cured in an associated matrix.

20 Claims, 5 Drawing Figures

U.S. Patent June 21, 1977 Sheet 1 of 2 4,030,863
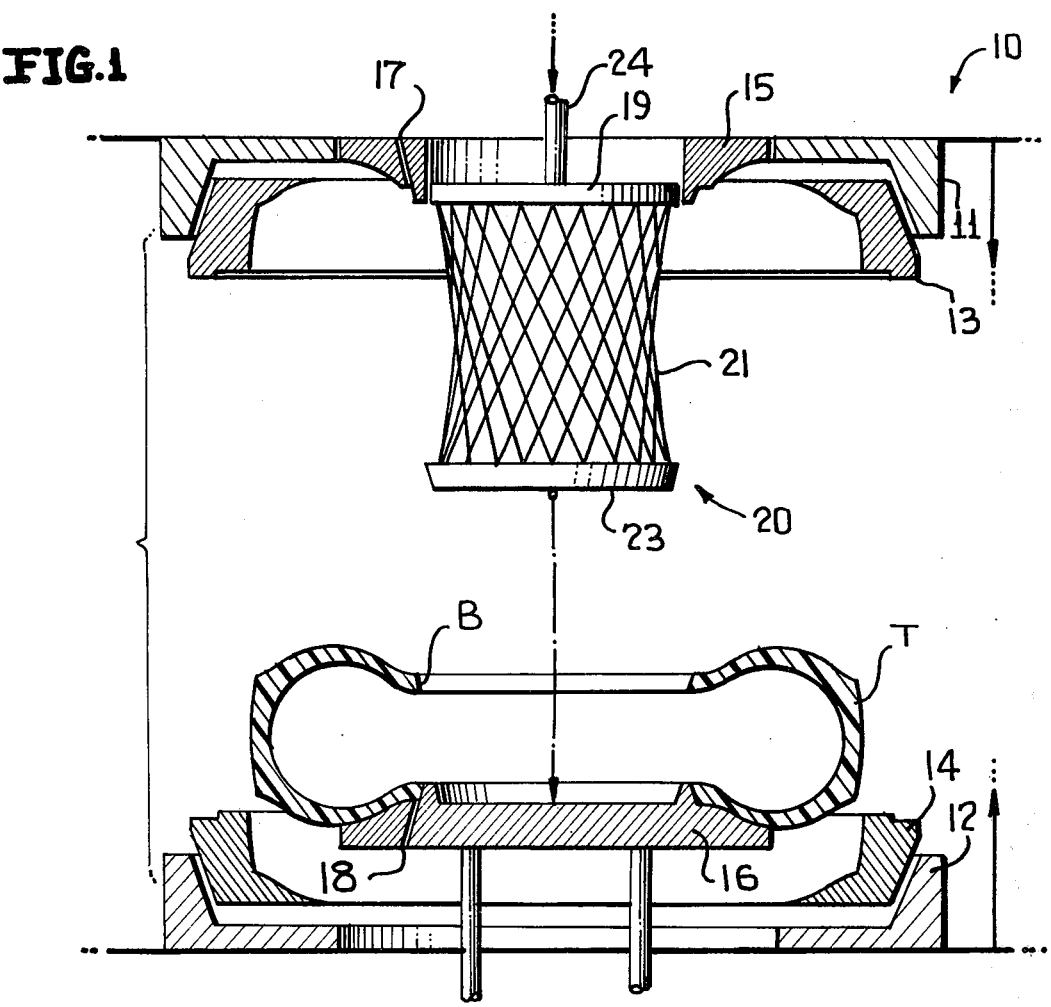
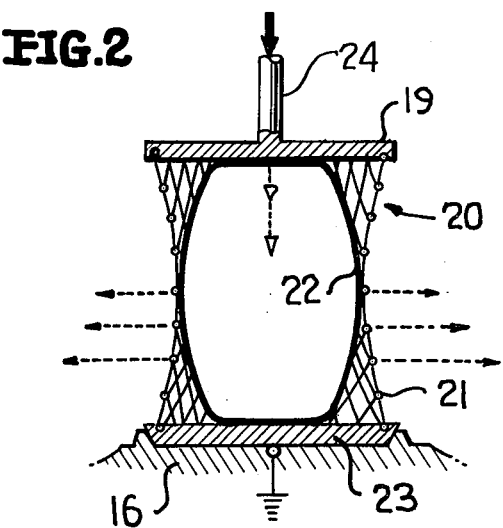
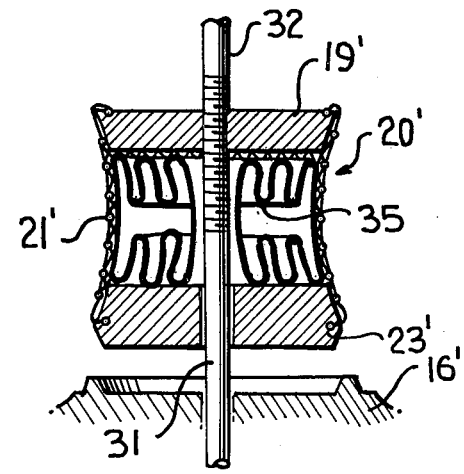

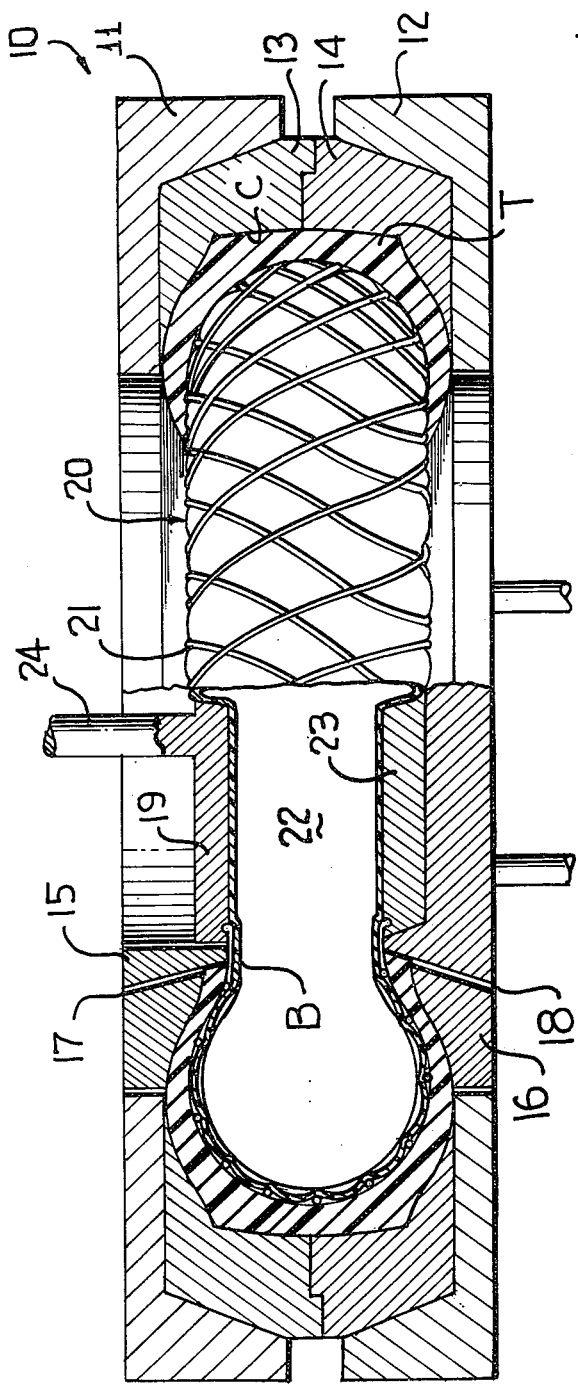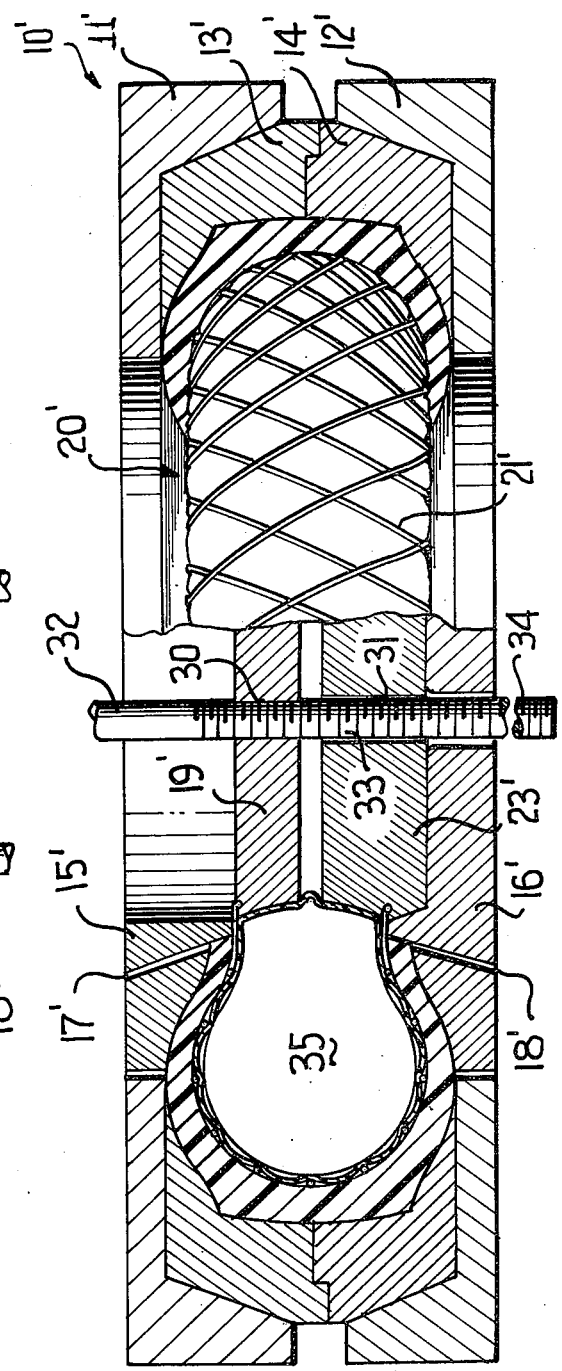

4,030,863

VENTING RETAINER FOR CURING TUBE

The present invention seeks to preclude a problem quite common in the recapping of tires, namely, that of air being entrapped between a curing bladder and an associated tire which results in the lack of uniform internal pressure during a curing operation and thus less than optimum binding between the new tread and the associated tire. Such diversity of internal pressure also results in a variance in the density of the new tread due to a difference in pressure across the area of the tread, and this conceivably causes non-uniform tread wear.

In keeping with the foregoing, it is a primary object of the invention to provide a novel venting retainer for a tire curing bladder, be it for an original tire or a recapped tire, comprising means for generally porously encapsulating a tire curing bladder whereby when associated with a matrix, air which might be normally trapped between the bladder and an associated tire will be vented to atmosphere.

A further object of this invention is to provide a novel venting retainer of the type heretofore defined wherein the encapsulating means is defined by mesh-like material, more specifically, a plurality of criss-crossed strands formed of high tensile-strength metal or any type of high-tensile strength material which is also resistant to deterioration by heat and/or pressure.

Still another object of this invention is to provide a venting retainer of the type heretofore described in combination with a tire curing bladder disposed generally within the encapsulating means, a pair of relatively movable plates, means for moving the plates relative to each other, and the encapsulating means being connected between the plates whereby the configuration of the encapsulating means may be varied between open and closed positions of associated matrices.

A further object of this invention is to provide a novel venting retainer of the type heretofore defined wherein the bladder is of a generally ball-type construction or of an annular configuration, and wherein the moving means includes a threaded post and threaded means rotatably securing at least one of the plates to the threaded post.

Yet another object of this invention is to provide a novel venting retainer of the type described in the last-mentioned object with the exception that the moving means may instead include a piston rod secured to one of the plates, and the piston rod being mounted for reciprocal movement in an associated fluid cylinder.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a longitudinal sectional view through a tire curing apparatus of this invention, and specifically discloses a venting retainer defined by a plurality of criss-crossed strands adapted to be inserted within the interior of a tire.

FIG. 2 is a schematic sectional view of the venting retainer of FIG. 1 and illustrates a ball-type bladder internally of the encapsulating means and the manner in which a pair of plates are moved relative to each other to expand the bladder radially along with the encapsulating means.

FIG. 3 is an enlarged cross-sectional view of the apparatus of FIG. 1, and illustrates the same in the closed position thereof.

FIG. 4 is a sectional view similar to FIG. 2 and illustrates an annular bladder encapsulated by a plurality of criss-crossed strands connected between a pair of relatively movable plates.

FIG. 5 is a sectional view similar to FIG. 4 but illustrating the bladder of FIG. 4 in its expanded condition.

A novel apparatus constructed in accordance with this invention is generally designated by the reference numeral 10 and includes a pair of platens 11 and 12. Associated with the platens 11 and 12 are matrices 13, 14 and bead plates 15, 16, respectively. The structure thus far described is conventional.

The matrices 13, 14 are generally spring or pneumatically or hydraulically urged away from the associated platens 11, 12 when the latter are in spaced relationship (open position) relative to each other. Means, now shown, are provided for moving the platens 11, 12 relative to each other to the closed position thereof (FIG. 3) at which time the matrices 13, 14 close to define an annular curing chamber C (FIG. 3). The bead plates 15, 16 include a plurality of circumferentially disposed bleed passages, vents or ports 17, 18, respectively, for venting air to atmosphere in a manner to be described hereinafter.

The apparatus 10 includes a venting retainer, generally designated by the reference numeral 20 which includes means 21 for generally porously encapsulating a tire curing tube, bladder or the like 22 (FIGS. 2 and 3). The encapsulating means 21 is defined by mesh-like material, preferably a plurality of criss-crossed strands of high tensile-strength material, preferably metal, but polymeric or copolymeric material may be utilized so long as it will not be adversely affected by high temperature and pressure. The strands (unnumbered) of the encapsulating means 21 are also preferably relatively nonelastic although elasticity inherent therein may be utilized and the construction of the strands from elastic material is further considered within the purview of this invention.

The strands of the encapsulating means 21 are connected to pair of plates 19, 23 and the plate 19 is connected to a rod or post 24 which is part of a hydraulic or fluid motor which permits the plate 19 to be moved toward and away from the plate 23 in a conventional manner.

In keeping with the venting mechanism or retainer 20 of FIGS. 1, 2 and 3, the bladder 22 thereof is of a ball-type or spherical construction composed of a hollow member formed of impermeable elastic material, such as rubber, a copolymer composition, or the like.

Assuming that a tire T (FIG. 1) is to be recapped or provided with a new tread, it is placed upon the lower bead aligner wheel 16 while the platens 11, 12 are in their open position. Thereafter the platen 12 preferably descends by conventional hydraulic means (not shown) during which time beads B of the tire are aligned between the bead aligner plates 15, 16, with the latter also descending by virtue of suitable hydraulic means (not shown) until the closed position thereof is reached (FIG. 3). During this downward motion of the platen 11, the mechanism which operates the rod 24 (not shown) which is preferably carried by the platen 11 also descends therewith. The plate 23 contacts the bead aligner wheel 16 at which time the continued descent of the platen 11 causes the encapsulating means 21 to move radially outwardly from the position shown in FIG. 1 toward the final position shown in FIG. 3. This radial outward motion can be further augmented by the descent of the rod 24. The same downward motion causes the bladder 22 to expand radially outwardly from the position shown in FIG. 2 to that shown in FIG. 3. In the latter position, it is to be noted that a plurality of the vent or bleed ports 17, 18 which circumscribe the bead aligner wheels 15, 16 are in line with the encapsulating means 21 adjacent the peripheral edges (unnumbered) of the plates 22, 23. Due to this construction, any air which might normally be entrapped between the bladder 22 and the tire T is bled to atmosphere through the interstices of the encapsulating means 21 and the ports 17, 18. Therefore, air pockets which result in soft spots will not be formed between the bladder 22 and the interior (unnumbered) of the tire T. Thus, upon a proper curing operation, a relatively uniform and excellent bond will be created. It is, of course, necessary during the curing operation to provide internal pressure and preferably heat in the bladder 22 and this is accomplished in a conventional manner by, for example, providing appropriate inlets and outlets into the bladder 22 through which steam hot water or the like might be circulated although preferably the circulating medium is a non-combustible, non-flammable liquid. Likewise, the matrices 13, 14 and/or the platens 11, 12 may be heated at the outer peripheries thereof (unnumbered) in order that the new rubber applied to the tire T will be heated exteriorly, as well as internally by the medium within the bladder 22.

Reference is now made to FIGS. 4 and 5 which disclose an apparatus substantially identical to that heretofore specifically described relative to FIGS. 1, 2 and 3. Insofar as identical structure is concerned, the same has been designated with primed reference numerals in FIGS. 4 and 5.

The apparatus 10' (FIG. 5) includes components 11', 12', 13', 14', 15', 16', 17', 18', 19', 20', 21', and 23', corresponding to those of the machine 10.

A difference between the plates 19, 23 and 19', 23', is that the latter are provided with bores 30, 31 respectively, with the bore 31 being threaded and the bore 31' being unthreaded. A post 32 having a threaded end portion 33 is threaded in the threaded bore 30, passing freely through the bore 32, and passes through an elarged bore 34 of the lower bead plate 16'. Due to this construction, the plate 19' may be rotated relative to the threaded rod 32 or vice versa which in the open position (not shown) of the apparatus 10' corresponding to that of FIG. 1 of the apparatus 10 can be utilized to lengthen or foreshorten the distance between the plates 19' and 23'. By lengthening or reducing the distance between the plates 19', 23', one may vary the amount of radial expansion of the encapsulating means 21' when the same has moved the corresponding distances illustrated in FIGS. 1 and 3 relative to the encapsulating means 21. Thus, by providing the movable plates 19', 23' relative to the threaded post 32, the same encapsulating means 20' may be utilized for different sizes of tires without any material change in the apparatus 10' except, of course, for replacing the matrices 13', 14' with different matrices depending upon the particular tire to be treaded or retreaded.

The remaining element of the apparatus 10' which differs from that of the apparatus 10 is the fact that a bladder 35 is of an annular configuration surrounding the threaded post 32, as opposed to the ball or spherical type bladder 22 of FIGS. 1 through 3. However, the bladder 35 is likewise constructed of impermeable elastic material (rubber-like) and is provided with suitable inlets and outlets for circulating a hot pressurized media therethrough such that upon the closing of the platens 11', 12' (FIG. 5) relative to a tire T', the latter will be cured in the manner heretofore described, noting in particular once again that air which might otherwise be entrapped between the bladder 35 and the interior of the tire T', is bled to atmosphere through the interstices of the encapsulating means 20' and the vent or bleed holes or ports 17', 18' of the respective bead aligner wheels 15', 16'.

While preferred forms and arrangement of parts have been shown in illustrating the invention, it is to be clearly understood that various changes in details and arrangement of parts may be made without departing from the scope and spirit of this disclosure.

I claim:

1. A venting retainer for a tire curing bladder comprising means for generally porously encapsulating an exterior surface of a tire curing bladder to vent air from between the exterior surface of the bladder and the tire interior, said encapsulating means being an element made separately from the bladder.

2. The venting retainer as defined in claim 1 wherein said encapsulating means is defined by mesh material.

3. The venting retainer as defined in claim 1 wherein said encapsulating means is defined by a plurality of criss-crossed strands.

4. The venting retainer as defined in claim 1 including in combination a tire curing bladder disposed generally within said encapsulating means.

5. The venting retainer as defined in claim 4 including a pair of relatively movable plates, means for moving said plates relative to each other, and said encapsulating means being connected between said plates.

6. The venting retainer as defined in claim 5 wherein said bladder is of a generally ball construction.

7. The venting retainer as defined in claim 5 wherein said bladder is of a generally annular configuration.

8. The venting retainer as defined in claim 5 wherein said moving means includes a threaded post, and thread means rotatably securing at least one of said plates to said threaded post.

9. The venting retainer as defined in claim 5 wherein said moving means includes a piston rod secured to one of said plates, and said piston rod being mounted for reciprocal movement in an associated fluid cylinder.

10. Apparatus for curing tires comprising a pair of relatively movable matrices, said matrices in a closed position thereof defining a generally annular chamber adapted to receive therein a tire to be cured, a tire curing bladder having and exterior surface, said curing bladder being adapted for location within the interior of a tire disposed within said annular chamber, means for generally porously exteriorly encapsulating said tire curing bladder exterior surface to vent air from between the latter and an associated tire, and said encapsulating means being an element made separately from said bladder.

11. The apparatus as defined in claim 10 wherein said encapsulating means is defined by mesh material.

12. The apparatus as defined in claim 10 wherein said encapsulating means is defined by a plurality of crisscrossed strands.

13. The apparatus as defined in claim 10 including a pair of relatively movable plates, means for moving said plates relative to each other, and said encapsulating means being connected between said plates.

14. The apparatus as defined in claim 13 wherein said bladder is of a generally ball construction.

15. The apparatus as defined in claim 13 wherein said bladder is of a generally annular configuration.

16. The apparatus as defined in claim 13 wherein said moving means includes a threaded post, and thread means rotatably securing at least one of said plates to said threaded post.

17. The apparatus as defined in claim 13 wherein said moving means includes a piston rod secured to one of said plates, and said piston rod being mounted for reciprocal movement in an associated fluid cylinder.

18. The apparatus as defined in claim 13 including a pair of bead plates for aligning a tire within said chamber, and vent means in said bead plates in fluid communication between said encapsulating means and atmosphere.

19. The apparatus as defined in claim 14 including a pair of bead plates for aligning a tire within said chamber, and vent means in said bead plates in fluid communication between said encapsulating means and atmosphere.

20. The apparatus as defined in claim 15 including a pair of bead plates for aligning a tire within said chamber, and vent means in said bead plates in fluid communication between said encapsulating means and atmosphere.

* * * * *